AUTOMATIC CONTROLLER
Filed June 30, 1961
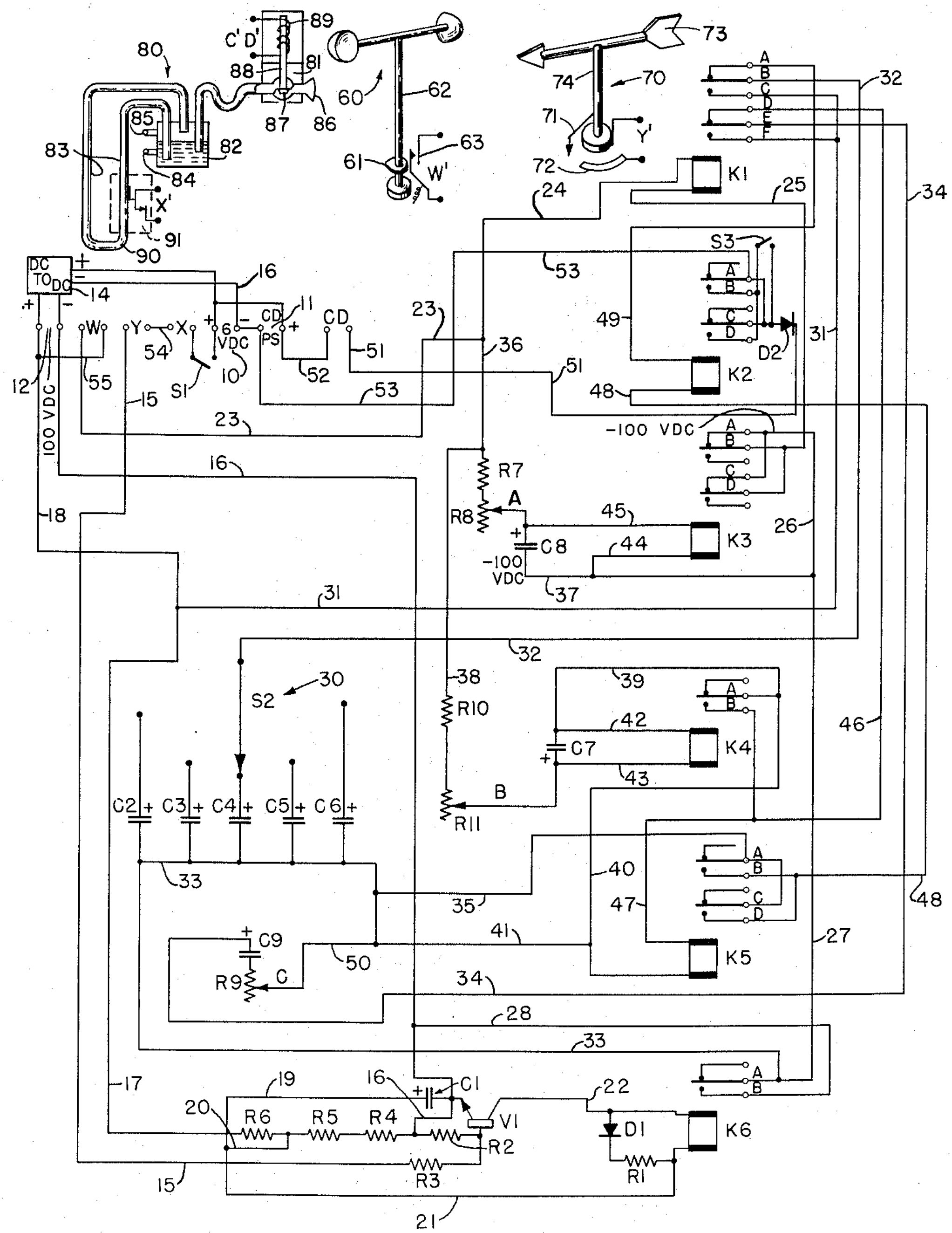
INVENTOR.
Louis T. Cleaver
BY Ernest S. Cohen
Gersten Sadowsky
ATTORNEYS United States Patent Office 3,117,586

Patented Jan. 14, 1964

3,117,586

AUTOMATIC CONTROLLER

Louis T. Cleaver, Denver, Colo., assignor to the United States of America as represented by the Secretary of the Interior Filed June 30, 1961, Ser. No. 121,259
11 Claims. (Cl. 137—78)
(Granted under Title 35, U.S. Code (1952) sec. 266)

The invention herein described and claimed may be manufactured and used by or for the Government of the United States of America for governmental purposes without the payment of royalties thereon or therefor.

The invention relates to improvements in an electrical apparatus responsive to signals produced by mechanisms sensitive to changes in ambient conditions occurring at random times and having varying periods of duration, and made operable thereby to deliver output signals to a controllable device. Output signals received by the controllable device determine the duration of its operative state, as well as the frequency with which such operations are initiated. Comprising the electrical apparatus of the present invention are a plurality of switchable and adjustable elements operable to fix the duration of the output signal, as well as to determine in accordance with the duration of the signals produced by the sensing mechanisms, the effectiveness of such signals in producing an output from the apparatus.

Accordingly, an object of the present invention is to provide a control apparatus operationally sensitive to signals representing widely varying ambient conditions, and responsively effective to closely define and maintain the duration of output signals within a range of time settings for such output signals.

Another object of the invention is to provide an electrical apparatus capable of producing in a simple manner an output signal whose characteristics of constant amplitude and controlled duration, are independent of either the amplitude or duration of the input signals delivered to the apparatus by the sensing mechanisms associated therewith.

A further object of the invention is to provide an electrical controller apparatus having reliable consistent operation over long periods of time and requiring minimal maintenance.

These and other objects of the invention will be more clearly understood from the following description of a preferred embodiment of the invention.

Referring to the FIGURE of the drawing, there is shown a circuit diagram of an apparatus according to the invention, including schematic representations of input signal generating mechanisms, and a controllable device receiving the output signals produced by the apparatus. Connected within the circuit arrangement illustrated are a plurality of terminal sets W, X, and Y, associated with corresponding terminals W', X', and Y' on the sensing mechanisms, and a terminal set CD associated with a terminal set C'D' on an arrangement including the controllable device receiving the signal output of the apparatus. Other terminal sets 10, 11, and 12 are shown, to which are connected 6 volt D.C., and 100 volt D.C. power sources, respectively. Element 13 represents a D.C. to D.C. converter supplied at input terminals with a 6 volt D.C. potential such as from a storage battery, and producing at output terminals a 100 volt D.C. potential source for connection to the terminals at 12. One form of a prior art converter suitable for use as element 13, comprises a transistorized oscillator supplied with the low voltage direct current, and operable to deliver an A.C. voltage to a rectifier-filter circuit which changes this A.C. voltage to a substantially ripple-free amplified direct current voltage. Each of the sensing mechanisms in response to ambient conditions, is effective to control the closure or opening of electrical contacts to complete or disrupt circuits across the terminal sets of the apparatus.

An On-Off switch $S_1$, when operated to On position completes a circuit connection between the positive terminal of the 6 volt D.C. source to an X terminal. Under the circumstances when the mechanisms connected to terminal sets X and Y are suitably conditioned, and switch $S_1$ is operated, a circuit is completed across terminals X, Y, and through line 15, and resistors $R_3$, $R_2$, to connect the source 10 positive terminal to the base circuit of an NPN transistor $V_1$. This circuit is returned to the minus terminal of source 10, through lines 16 by means of terminal 14 on element 13. The amplitude of the current to the base circuit of $V_1$ is sufficient to cause the transistor to conduct through lines 19, 21 and 22, and cause energization of relay $K_6$ to thereby close the relay's normally open contacts $K_6$ *a—b*. Operation of these relay contacts completes a return line to the negative side of the 100 volt D.C. power circuit from various major components of the apparatus. The apparatus is thus placed in operating condition and will remain in this condition only as long as both start switch $S_1$, and the contacts in the sensing mechanisms connected to the terminals X and Y, are closed.

In the power source control circuitry to transistor $V_1$, the base resistor $R_3$ is a limiting resistor to protect $V_1$ from an excessive input signal. Base to emitter resistor $R_2$ is a biasing resistor to hold the operating point of $V_1$ steady. A voltage divider formed by resistors $R_4$, $R_5$, and $R_6$, connected in a circuit to the source 12, by lines 16, 17, 18, and to $V_1$ by lines 20, 21, 22, determine the proper positive potential to the collector circuit of $V_1$. To protect the coil of relay $K_6$ from excessive voltage peaks which might build up across this coil during operation of the circuit, a shunt circuit of diode $D_1$ and resistor $R_1$, is connected across this coil. Condenser $C_1$ being effective as a shunt capacitor across resistors $R_4$, $R_5$, through lines 16, 19, and 20, acts to hold steady the voltage delivered to the collector circuit of $V_1$.

When there is a closure of contacts in the sensing mechanism connnected to terminals W, a relay $K_1$ is operated through the normally closed contacts $K_3$ *a—b*, and $K_3$ *c—d* of a relay $K_3$. The relevant circuit connections are completed through lines 23, 24, 25, the $K_3$ contacts, lines 26, 27, closed contacts $K_6$ *a—b*, and negative voltage return lines 16 and 28. A capacitor bank 30 including five condensers $C_2$ to $C_6$, each one in turn being of a progressively higher rated capacity, and a rotatable switch $S_2$, functions as a timing selector for determining an interval during which there is an effective output signal from the apparatus. Contacts $K_1$ *b—c*, closed by the operation of relay $K_1$, cause the selected one of the capacitors of bank 30, to charge towards the 100 volt D.C. source. This charging circuit is completed through lines 18, 31, the closed $K_1$ contacts, 32, $S_2$, 33, closed contacts $K_6$ *a—b*, and return lines 16 and 28 to the source 12. Closed contacts $K_1$ *e—f* cause capacitor $C_9$ to charge towards the 100 volt D.C. source at a rate determined by the time constant of the series circuit including capacitor $C_9$ and resistor $R_9$. This charging circuit is completed through lines 18, 31, the closed $K_1$ contacts, lines 34, 50, 35, 33, closed contacts $K_6$ *a—b*, and return lines 16 and 28 to the power source 12. As is apparent from the connections of the respective charging circuits, the amount of charge each of the capacitors receives towards completing their full or required charge for operation, depends on the length of time there is a closure of the contacts in the sensing circuit across terminals W.

In addition to the charging effects previously noted, a capacitor $C_8$, charges towards the 100 volt D.C. source 12, at a rate determined by the time constant of a series circuit including resistors $R_7$, $R_8$, capacitor $C_8$, and the impedance of the coil of relay $K_3$. The charging circuit may be traced from source 12 through line 55, terminals W, lines 23, 36, 37, 27, closed contacts $K_6$ *a—b*, and source return lines 16 and 28. A capacitor $C_7$ also charges toward the 100 volt D.C. source at a rate determined by the time constant of a series circuit including resistors $R_{10}$, $R_{11}$, capacitor $C_7$, and the impedance of the coil of relay $K_4$. This circuit may be also traced from source 12 through line 55, terminals W, lines 23, 36, 38, 39, 40, 41, 35', 33, closed contacts $K_6$ *a—b*, and return lines 16 and 28 to the negative source 12. The amount of charge each of the capacitors $C_8$ and $C_7$ receives toward making them effective, also depends on the length of time the sensing circuit to terminals W remain closed. In the case of capacitor $C_7$, a control B at variable resistor $R_{11}$, can be adjusted so that capacitor $C_7$ will be effective to operate the coil of a relay $K_4$, over lines 42, 43, at the same time as charged capacitor $C_8$ is effective to operate the coil of relay $K_3$, over lines 37, 44, 45. The charging period of capacitor $C_8$ is set by control A on variable resistor $R_8$, so that it may accumulate a charge sufficiently large to operate relay $K_3$. Charging periods for capacitors $C_7$ and $C_8$ are set in this manner for purposes to be hereinafter described.

At any time that the sensing contacts in the circuit across terminals W, open before the charge on capacitor $C_8$ becomes effective to operate relay $K_3$, the coil of relay $K_1$ is cut off from the power source 12, and is deenergized. As a result normally closed contacts $K_1$ *d—e* return to normal and capacitor $C_9$ discharges through the series circuit completed by contacts $K_1$ *d—e*, lines 46, 47, coil of relay $K_5$, lines 41, 50, $R_9$, and line 34. The discharge energizes relay $K_5$, which operates to close its contacts $K_5$ *a—b*, and $K_5$ *c—d*. A circuit completed through these closed contacts of relay $K_5$, and lines 35, 33, a capacitor of bank 30, line 32, normally closed contacts $K_1$ *a—b*, and lines 49 and 48, energizes the coil of relay $K_2$ to operational condition. A discharge period for capacitor $C_9$ is set to be sufficiently long to permit relay $K_2$ to be operational long enough to perform its control function. A control C on variable resistor $R_9$ is adjustable to set a time constant for the charging circuit of the capacitor $C_9$ such that it will receive an operational charge sufficient to energize relay $K_5$ during any operationally pertinent closure period of the sensing contacts in the circuit across terminals W. It is evident that the larger the capacitance value of the individual capacitor selected by $S_2$ from among elements $C_2$ to $C_6$, the longer the operational period for relay $K_2$. Nevertheless, an adjustment of the control C may reduce the discharge time of capacitor $C_9$ such that relay $K_5$ becomes inoperative early to shorten the time that relay $K_2$ is operative. Consequently, the selectable range of time periods for relay $K_2$ operation in accordance with capacitors $C_2$ to $C_6$, may be limited by the overriding effect of an adjustment of control C.

Relay $K_2$ operates to close contacts $K_2$ *a—b*, and $K_2$ *c—d*, which completes a series circuit through line 51, and circuit of the controllable device connected across terminals CD, through the 6-volt D.C. source 10, positive to negative across terminals 11, and line 53, to effect operation of the controllable device.

Diode $D_2$ is placed across the normally open contacts of relay $K_2$ to protect them from any arcing which may occur due to the nature of the controllable device. A manually operated test switch $S_3$ is connected across the normally open contacts of relay $K_2$. It can be operated at any time, irrespective of the operational state of the apparatus, to deliver a control signal to the controlled device.

Reference is again made to capacitor $C_7$ which upon receipt of sufficient charge to enable it to cause a current of high enough value to flow through lines 42, 43, and the coil of relay $K_4$, operates this relay to cause contacts $K_4$ *a—b* to close. The closing of contacts $K_4$ *a—b* short circuits the coil of relay $K_5$ to render it inoperative during this shorting period. Control B on variable resistor $R_{11}$, and other fixed values of the associated circuit are operative to determine a time constant for capacitor $C_7$ in its series circuit including $R_{10}$, $R_{11}$, and the impedance of relay $K_4$, such that the period of this time constant is relatively short in respect to the period of the time constant determined in the series circuit comprising $R_7$, $R_8$, $C_8$, for capacitor $C_8$. Since capacitor $C_7$ is operative to repeatedly charge and discharge in short time intervals, the aforementioned timing relationship between capacitors $C_7$ and $C_8$, makes possible a coincidental control by the joint action of the capacitors over a wide range of timing periods to which capacitor $C_8$ may be set by control A. However, any adjustment setting the relatively long charging period for capacitor $C_9$, is made so as not to be an exact multiple of the charging period set for capacitor $C_7$. This is done to better achieve the hereinafter more fully explained operation of capacitor $C_7$ to be effective in rendering inoperative the dispensing control determined by the operation of capacitor $C_9$ and relay $K_5$. That is, to provide for the discharging of capacitor $C_7$ to operate its associated relay $K_4$ to short-out the coil of relay $K_5$ at an appropriate time to avoid relay $K_5$ being made operative to any significant extent by a concurrent discharge from capacitor $C_9$.

In the event that the sensing contacts in the circuit across terminals W remain closed for a period long enough for capacitor $C_8$ to receive sufficient charge to cause a current of high enough value to flow through the coil of relay $K_3$, the latter operates to cause its normally closed contacts $K_3$ *a—b*, and $K_3$ *c—d*, to open. Because of the quite large time constant of the series circuit $R_7$, $R_8$ and $C_8$ which charges capacitor $C_8$, this capacitor will be the last one of all the capacitors then charging, to receive a charge sufficiently large to operate its associated relay $K_3$. Thus all other charging capacitors will already be holding an operational charge when relay $K_3$ operates. The opening of contacts $K_3$ *a—b*, and $K_3$ *c—d*, opens the operating circuit of relay $K_1$, and returns the contacts of this relay to their normal state. Due to the closing of normally closed contacts $K_1$ *d—e*, the charging cycle of capacitor $C_9$ is interrupted, and there is a discharge of this capacitor through the coil of relay $K_5$, in the manner previously explained. Operation of relay $K_5$ closes its contacts $K_5$ *a—b*, and $K_5$ *c—d*, to place relay $K_2$ in operational condition. However, under these particular circumstances relay $K_5$ either does not operate as described, or its operation is almost immediately interrupted as the result of operational sequences in the circuitry associated with capacitor $C_7$ and relay $K_4$. Although the concurrent closure of contacts $K_1$ *a—b*, also interrupts the charging cycle of the selected capacitor of bank 30, and closes a portion of the discharge circuit of this selected capacitor through the coil of relay $K_2$, this relay does not operate as a result of this capacitor discharge since contacts $K_5$ *a—b*, and $K_5$ *c—d* are now open in this discharge circuit.

As previously noted, preset adjustments of controls A and B determine the charging periods of capacitors $C_8$ and $C_7$ such that there will be an almost simultaneous discharge of these capacitors through the coils of the respective relays $K_3$ and $K_4$ associated therewith. Moreover, the period of time that capacitor $C_7$ discharges through the coil of relay $K_4$, is set to be longer than the time period during which any capacitor selected by switch $S_2$ discharges through the coil of relay $K_2$. It is therefore evident that in any particular closure cycle for the contacts in the circuit across terminals W, relay $K_2$ will not be operated once capacitor $C_7$ has operated relay $K_4$, even though the capacitor becomes fully discharged and relay $K_4$ is released to its normal state. Consequently, suitable adjustments of controls A and B in the timing circuits of capacitors $C_8$ and $C_7$, determine the maximum time periods for determining any output signal at terminals CD.

Normally, the circuitry affected by the input signals generated by the closure of the sensing contacts circuited across terminals W, is returned to its normal condition following the opening of such contacts, and the delivery of any additional operational signals to terminals CD and the controllable device is terminated. In addition, the apparatus will remain inoperative until the sensing contacts across terminals W are again closed. In rare instances, when the closure of the contacts across W and the continuing discharge operation of condenser $C_8$ to operate relay $K_3$, coincide, there will still be no operational output since the apparatus will respond to such contact closures only when relay $K_3$ is in its normal condition. However, due to the random nature of the occurence of the closure of the contacts across W, this coincident operational condition would result only in a very minor reduction of sensitivity of the apparatus to the varying ambient conditions being sensed at the contacts across terminals W.

Ambient conditions such as sensed by the devices connected across terminals X and Y of the apparatus, are the overriding control governing the over-all operation of the apparatus. Referring to the figure of the drawing, it is evident that if the contacts across terminals X or Y are opened, the operating power for relay $K_6$ is cut off since the power circuit comprising elements $V_1$, $C_1$, and resistors $R_2$ to $R_6$, will become ineffective. Consequently, contacts $K_6$ *a—b* will open to terminate the 100 volt D.C. input supply to the various capacitors and relays of the apparatus.

The manually operated control switch $S_2$, used to select the desired time duration for each of the repeated operations of the controllable device connected to terminals CD, may be positioned to make a selection of a time duration, either during the operation of the apparatus, or at a time when there is no operation. Manually operated controls A, B, and C, which are in effect calibration controls presetting operational limits with respects to the varying ambient conditions sensed by the contacts of the device connected in circuit across terminals W, are adjusted before operation of the apparatus.

Use is made of paralleled contacts on relays $K_2$, $K_3$, and $K_5$, to assure positive contacting when the relay operating circuits are made operatively effective. An increase in the reliability of operation of the apparatus is achieved thereby.

An exemplary illustration of the operation of the apparatus according to the invention, as an automatic controller unit for a dispenser of fatty alcohol, is given in connection with the schematic showing on the upper part of the figure of the drawing. Associated with contacts W′ in an anemometer arrangement 60, and with contacts Y′ is a wind direction responsive mechanism 70. An arrangement 80 comprising a controllable dispensing device 81 and a closed tank storage facility 82, is provided with a mercury manometer structure 83 connected to sense the pressure at the upper and lower ends of the storage tank, and to indicate the level of the fatty alcohol supply therein. An inlet 84 on the storage tank 82 may be opened to pass a supply of fatty alcohol to the tank, and a pipe 85 also on the tank provides a connection from the tank to a container of inert gas under pressure. A flow through spray nozzle 86 connected at the end of a conduit leading to storage tank 82, is controlled by a conventional valve 87, having its stem 88 as part of a core in a solenoid 89. Terminals C′D′ are connected to leads from the ends of the solenoid. Attached to arm 90 of the manometer structure 83, is a mercury level sensing switch means 91, which remains closed to complete a circuit across terminals X′ as long as the manometer indicates an adequate level of liquid fatty alcohol in storage tank 82.

Wind direction mechanism 70, comprising the usual vane element 73 rotating a shaft 74, cooperates with a sliding contact means electrically connected to terminals Y′. Element 72 of this contact means is a flat conducting strip formed as an arcuate segment of about 90 degrees. The strip is fixed in position about the axis of shaft 74 as its arcuate center, such that it is in the path of the prevailing off-shore wind. A contacting finger element 71 attached to rotate with the shaft 74 is aligned to slide on strip 72 only when the vane 73 is directed to indicate a wind direction defining the aforesaid prevailing wind within an arc of 90 degrees. Appropriate leads from contact elements 71, 72, connect them to terminals Y′.

In the anemometer 60, the shaft 62 which rotates in accordance with wind velocity, supports an actuator cam 61 cooperating with normally open switch contacts 63. As is evident from the drawing, the cam 61 will maintain the contacts 63 closed for a period of time upon each revolution of the shaft, the length of such period varying inversely with the angular velocity of the rotating shaft. Contacts 63 are connected to terminals W′ by means of the usual leads.

Operation of the over-all apparatus requires that bursts of fatty alcohol be dispensed through nozzle 86 as a mist or spray of particles, into a wind of proper direction and suitable velocity. In place on the shore of a lake or other water storage facility, this apparatus operates to supply the fatty alcohol spray into a wind blowing on to the water from the shore. The mist of fatty alcohol in the wind settles as a fine powdery substance on the surface of the water, to form a monomolecular covering layer thereon. It has been demonstrated that a layer of this nature on a water surface is effective to retard evaporation. For a further explanation of this phenomenon, reference may be made to a copending application Serial No. 121,261, of even date, by Florey et al., and assigned to the assignee in this case.

To prepare the controller for operation, contact means 91 is positioned on the arm 90 of the manometer such that this means will be open circuited when the level of the supply of fatty alcohol in storage 81 falls below a predetermined height. Terminals W′, Y′, X′ and C′D′ of the mechanisms 60, 70, and 80, are joined to their corresponding terminals W, Y, X, and CD on the controller apparatus. With an adequate supply of fatty alcohol in storage tank 82, and an appropriate off-shore wind positioning vane 73, switch elements 91, and 71, 72, are effective to complete circuits across terminals X and Y. To initiate operations in the controller apparatus, switch $S_1$ is shifted to On, to close its contacts and complete a circuit from the 6 volt D.C. source 10, to the relay $K_6$ power circuit comprising transistor $V_1$. Relay $K_6$ is energized to close its contacts $K_6$ *a—b*, whereby return circuits to the negative terminal of the 100 volt D.C. power source are prepared for allowing the subsequent operation of relay $K_1$, and the charging of the selected capacitor in bank 30, and capacitors $C_9$, $C_8$, and $C_7$.

For the controller of the present example, operational limitations to be imposed in the dispensing of the fatty alcohol are that each burst be of constant duration, and that there be no dispensing at wind velocities above 20 miles per hour, and below 3 miles per hour. Accordingly, the appropriate operational characteristics for the anemometer controlled electrical structure comprising contacts W, are such that at the wind speed of about three miles per hour, the contacts remain in circuit making closure for about 29 seconds out of 145 seconds between each making of contact, and at the wind speed of about twenty miles per hour, the contacts remain in circuit making closure for about 11 seconds out of 55 seconds between each making of contact. Further, it would be found that in this structure, the nature of the mechanical action involved in the making of the contacts, results in the desired operational stability of the controller being achieved if capacitor charging was effectuated only during approximately one quarter of the contact make or closure period at all wind velocities of interest. This results in capacitor-charge periods ranging from approximately 3 seconds at twenty miles per hour wind velocity, to approximately 8 seconds at three miles per hour wind velocity. Consequently, the charging circuit $R_7$, $R_8$, $C_8$, is set in the present example by adjusting the control A so that $C_8$ will be sufficiently charged after 8 seconds to discharge through the coil of relay $K_3$, to operate this relay for deenergizing the basic control relay $K_1$. Capacitor $C_7$ which is set to repeatedly operate at relatively short intervals but at intervals no less than the largest capacitor discharge setting available on bank 30, cooperates with capacitor $C_8$ as previously noted, to operate relay $K_4$ and to thereby short out relay $K_5$ to prevent dispensing. These adjustments therefore set the lowest wind velocity cut-off value for the controller. In a similar manner the charging circuit comprising $C_9$, $R_9$, and the impedance of relay $K_5$, is set by adjusting the control C in this circuit, to enable $C_9$ to charge sufficiently in no less than 3 seconds to operate relay $K_5$. This latter setting of course defines the high-wind velocity cut-off value for the controller since at speeds above twenty miles per hour the contacts at W will not be closed for the requisite 3 seconds, and relay $K_5$ will not be effective to connect any selected capacitor of bank 30 to discharge through the coil of output control relay $K_2$.

To set the apparatus to control dispensing in bursts of a predetermined constant duration, switch $S_2$ is positioned to select $C_4$ in the capacitor bank 30. No pertinent limitations need be considered in respect to determining the charging periods required to charge the various capacitors of $C_2$ to $C_6$ of bank 30, so long as they will be charged sufficiently during the shortest closure period of interest of the contacts across the W terminals. If by chance the $S_2$ switch selects to connect in circuit a capacitor of bank 30 which is too large in value to provide control for the valve controlling solenoid, the period of operation of this valve will be a function of the closure period of the anemometer contacts across terminals W, and not of the discharge of the particular selected capacitor in use. For the example being considered, typical solenoid valve dispensing periods at a wind velocity of ten miles per hour, range from a high of 1 second for capacitor $C_6$, to a low of 0.15 second for capacitor $C_2$.

Assuming operation of the apparatus in a steady 10 miles an hour wind, the shaft 62 rotates to close contacts 63, and capacitors $C_8$ and $C_7$ begin to charge to the end of operating relays $K_3$ and $K_4$, respectively. Relay $K_1$ is operated to close it contacts $K_1$ *b—c*, and $K_1$ *e—f*, and capacitors $C_9$ and $C_4$ begin their charging cycles. Closed contacts $K_6$ *a—b*, maintain the circuit complete from the 100 volt D.C., power source to the various components now operated and charging. On opening of the contacts 63 after a time period determined by the velocity of the wind, capacitor $C_8$ stops charging and leaks accumulated charge through the impedance of the coil of relay $K_3$, but since the charge is insufficient, does not operate the relay. Similarly capacitor $C_7$ stops charging and leaks accumulated charge through the impedance of the coil of relay $K_4$, but does not operate this relay. Relay $K_1$ operates to close its normally closed contacts $K_1$ *a—b*, and $K_1$ *d—e*, and as a result capacitor $C_9$ discharges through the coil of relay $K_5$ to operate this relay. Charged capacitor $C_4$ may now discharge through contacts $K_5$ *a—b*, and $K_5$ *c—d*, and the coil of relay $K_2$ to operate this relay, closing contacts $K_2$ *a—b*, and $K_2$ *c—d*, whereby power source 10 is made available across terminals C′D′. Solenoid 89 is energized to operate valve means 87, 88 to an open condition to permit flow to nozzle 86 as long as capacitor $C_4$ is discharging to operate relay $K_2$. The duration of this flow is determined by the value of the time constant of the series discharge circuit for $C_4$, including the impedance of the coil of relay $K_2$. Operational sequences of this nature will occur at regular intervals when the anemometer is driven by the steady ten miles an hour wind to cause contacts 63 to be alternately closed and opened.

If the anemometer should be driven by intermittent winds of random occurrence reaching velocities of ten miles per hour, the operational sequences and resultant valve control would be as previously described with the exception that the frequency of operation would be random and the dispensing of the fatty alcohol would comprise flows of fixed duration, but of random frequency.

Considering now the operation of the apparatus and the devices connected thereto, with wind velocities of suitable direction, but falling below three miles per hour, and with the storage facility at an adequate level, capacitors $C_8$ and $C_7$ begin to charge to the end of operating relays $K_3$ and $K_4$ respectively. Relay $K_1$ now operated closes its normally open contacts to begin the charging cycles for capacitors $C_9$ and $C_4$. Dut to the preset values for the time constants of the series circuits $R_7$, $R_8$, $C_8$ and the impedance of the coil of relay $K_3$, and $R_{10}$, $R_{11}$, $C_7$ and the impedance of the coil of relay $K_4$, the capacitors $C_8$ and $C_7$ will receive charges of sufficient value to operate relays $K_3$ and $K_4$, during the relatively long closure period of the anemometer contacts 63 due to the low wind velocity. The relays $K_3$ and $K_4$ will operate practically simultaneously.

Operation of relay $K_3$ will open the power circuit to relay $K_1$ and return it to normal condition. As previously explained, this will interrupt the charging cycles of capacitors $C_9$ and $C_4$, and place the capacitors in their discharge circuits across the coils of the associated relays. On operating relay $K_4$, the coil of relay $K_5$ will be shorted to render the relay inoperative and thus hold open the circuit wherein capacitor $C_4$ would otherwise have discharged through the coil of relay $K_2$. Therefore, with relay $K_2$ inoperative, there is no power circuit connection to the solenoid 89, and the valve means 87, 88 remains in position to block the flow of fatty alcohol to the nozzle 86.

Operation of the apparatus and devices when the storage facility 81 is sufficiently full, and the wind is in a suitable direction but rising above twenty miles per hour, initiates the usual charging of capacitors $C_8$ and $C_7$, when the contacts 63 are closed. As previously explained relays $K_3$ and $K_4$ do not operate during this rapid contact closure and opening at high wind velocities. Relay $K_1$ does operate to place capacitors $C_9$ and $C_4$ in their discharge circuits across the coils of relays $K_5$ and $K_2$, respectively. However, due to the preset value of the time constant of the series circuit $C_9$, $R_9$, the capacitor $C_9$ does not receive sufficient charge to operate relay $K_5$ during this short closure period of the anemometer contacts 63. Failure of relay $K_5$ to operate holds open the circuit through which capacitor $C_4$ would otherwise discharge to operate the relay $K_2$.. Again no valve opening is effected in device 82, and there is no flow through nozzle 86.

Assuming a wind velocity between the limits of 3 to 20 miles per hour but with the level of supply in storage tank 82 below the setting of the closure means 91 on the manometer 90. Since this condition allows contacts 91 to be opened, power source 10 is not connected to the power circuit comprising transistor $V_1$, and closure of contacts 63 by the cam 61 on the anemometer, will of course be ineffective in the relay circuits. That is, relay $K_6$ is not operated, and the negative return circuits to power source 12 from the various components of the apparatus, remain incomplete. All relays in the circuitry are placed, or remain in their normal conditions, until a proper level of fatty alcohol is supplied to the storage tank 82.

A similar cut off of the power sources exists when the wind is not in a suitable direction, such as when it is coming from over the water and towards the dispensing device. The break between contacts 71 and 72, caused thereby, maintains an open circuit from the source 10 to the power circuit operating relay $K_6$, and this and the other relays involved do not operate. Again, the apparatus is ineffective to cause operation of valve 87 to dispensing condition.

While a preferred embodiment of the invention has been illustrated and described herein, it is to be understood that the invention is not limited thereby, but is susceptible of changes in form and detail.

I claim:

1. An automatic controller apparatus comprising means receiving input signals varying with random ambient conditions, means making available output signals effective to operate an actuating means, an interconnecting network joining said input signal receiving means to a plurality of signal storage elements and a plurality of powered devices operable to produce the output signals in response to the input signals, and separate settable and positionable means operable to selectively preset a capacity for each of said signal storage elements, determing thereby the effectiveness of the input signals to operate the devices, and the duration of the output signals produced by said devices, respectively.

2. The automatic controller apparatus of claim 1, and said powered devices comprising a plurality of relays, said storage elements comprising a plurality of capacitors, a plurality of circuits connecting separate ones of the capacitors to the operating means of individual relays, the said positionable means being operative in one of said connecting circuits, and the said settable means being operable in the remainder of said connecting circuits.

3. The automatic controller apparatus of claim 2, and in each of the said remaining connecting circuits, the settable means comprising a control operable to set the time constant of the circuit and thereby determine the rate of charge of the capacitor therein, and in the said one of said connecting circuits, the positionable means comprising a selector switch movable to contact a terminal of one of a number of capacitors, each of a different capacity, and thereby connect the said contacted capacitor into the relay circuit of the related relay.

4. An automatic controller apparatus comprising a first means receiving input signals of varying duration in accordance with random ambient conditions, a second means making available output signals effective to operate an actuating means, a first device connected to said second means and operable to produce the output signals, a plurality of means responsive to the duration of signals to store them, and connected to said first means to effect storage of signals received thereby, a second device connected to one of said storing means and responsive to the signal stored therein to operate and connect another of said storing means to the said first device, whereby the first device operates to produce an output signal.

5. The automatic controller apparatus of claim 4, wherein further means associated with the said one of the storing means, is adjustable to determine the minimum duration for any signal received to be stored from the said first means, which would be effective to operate the said second device, and additional means associated with the other of said storing means, positionable to determine the duration of the operation of the said first device and the output signal produced thereby.

6. An electrical apparatus automatically controlling an actuating device, comprising separate low voltage and high voltage power sources, each having first and second output terminals, a first relay operable to prepare first circuit connections from one terminal of the high voltage source to the operating means of a second relay, and to a plurality of electrical signal storage elements, a power circuit connected to the operating means of the first relay and to one terminal of said low voltage source, a plurality of sets of input means receiving signals of varying duration in accordance with random ambient conditions, second circuit connections including at least one set of said input means to join said power circuit to the other terminal of said low voltage source to activate in response to a signal received on said input means said circuit to operate the said first relay to prepare said first circuit connections, third circuit connections including another set of said input means to join said second relay operating means to the other terminal of said high voltage source to operate said second relay in response to a signal receved on said other input means, a third relay means having means thereon connected to said low voltage power source and operable to produce an output signal from said source to said actuating device, fourth circuit connections including circuit closure means made effective on said operated second relay to join at least two of said signal storage elements to the other terminal of said high voltage source to initiate the storage of a signal in each said storage elements, fourth relay means operable to effect closure of circuit means in fifth circuit connections joining the operating means of the third relay to one of said signal storage elements, sixth circuit connections joining the operating means of the fourth relay means to the other of the signal storage elements which is operable to discharge after a predetermined interval of time after closure of said other set of input means, to operate said fourth relay whereby closure of the circuit means of the fifth circuit connections is made effective to supply the discharge output of the said one signal storage element to the operating means of the third relay to cause operation thereof for supplying an output from said low voltage source to the actuating means.

7. The electrical apparatus of claim 6, and adjustable means associated with the said one of said signal storage elements, operable to determine said predetermined interval of time to set the minimum duration for any effective input signal, and positionable means associated with the said other of the signal storage elements, operable to predetermine the duration of the operation of the said third relay means and its function to supply a power source output to the actuating means.

8. An automatic controller apparatus comprising means receiving input signals varying with random ambient conditions, means connected to said input signal receiving means sensing said conditions, and comprising a first mechanism responsive to the velocity of a flowing current to produce a sequence of separate signals each signal varying in duration in accordance with the instant variations of the said velocity, a second mechanism responsive to means sensing the direction of flow in said current to produce a continuing signal when the direction sensed is within a predetermined range of directions, and to interrupt said signal when the direction sensed is outside said range, and a third mechanism responsive to an indicator in an arrangement measuring the pressure in a facility storing dispensable material, and having means to produce a continuing signal when the indicator shows a pressure within a predetermined range of pressures, and to interrupt said signal when the pressure shown is outside of said predetermined range, a device to dispense the material of said storage facility, actuating means for operating said device to dispense, output means making available signals of varying duration and connected to operate said actuating means in accordance with the duration of each of said signals made available, an interconnecting network joining said input signal receiving means to signal storage elements and powered devices operable to produce the signals made available at said output means in response to the input signals.

9. The automatic controller apparatus of claim 8, and separate settable and positionable means for said signal storage elements, determining the effectiveness of the input signals to operate the powered devices, and the duration of each of the output signals produced by said devices, respectively.

10. The automatic controller apparatus of claim 1, wherein said powered devices comprise a plurality of relays, each having an operating part and a part comprising normally open and normally closed contacts operable by the relay to complete or interrupt circuits, said signal storage elements comprising a plurality of separately operable storage units, a power circuit responsive to input signals and effective to supply power to a first relay operating part to actuate its related contacts, a first circuit responsive to the input signals and including actuated contacts of the first relay, to energize a second relay operating part to actuate its related contacts, a second circuit responsive to input signals and including operated contacts of said second relay, to store signals in said signal storage elements, a third circuit including connections to all but two of said storage units of the said signal storage elements, to energize third and fourth relay operating parts to actuate their contacts, a fourth circuit responsive to the operation of the third and fourth relays to produce the output signals available to operate the actuating means, a fifth and sixth circuit each including one of said two storage units, to energize fifth and sixth relay operating parts to actuate their related contacts whereby said first circuit also including normally closed contacts of said fifth relay opened by said actuation of its contacts, is made ineffective to maintain operation of said second relay, a seventh circuit including normally open contacts of said sixth relay, is effective upon actuation of such contacts to short the third circuit whereby the operating part of the fourth relay is deenergized and its related contacts returned to normal, and thereby causing the third relay operating means to be deenergized to cut off the output signal to the actuating means.

11. The automatic controller apparatus of claim 10, wherein the settable means comprises a control device in each of the fifth and sixth circuits, operable to set the time constants of the respective circuits and thereby determine the rate of charge of the individual storage units therein by the input signals, the positionable means comprising a selector switch in said third circuit, movable to contact therein a terminal of one of its storage units each of which is of a different storage capacity, to operatively connect the contacted storage unit into the third circuit.

References Cited in the file of this patent

UNITED STATES PATENTS

| | | |
|---|---|---|
| 2,067,413 | Plaisted | Jan. 12, 1937 |
| 2,161,960 | Hintze | June 13, 1939 |
| 2,870,383 | Mazzarella | Jan. 20, 1959 |
| 2,923,861 | Colt | Feb. 2, 1960 |